United States Patent
Pepper

(10) Patent No.: US 11,050,527 B1
(45) Date of Patent: Jun. 29, 2021

(54) METHODS, SYSTEMS, AND COMPUTER READABLE MEDIA FOR TESTING OF HARDENED FORWARD ERROR CORRECTION (FEC) IMPLEMENTATIONS

(71) Applicant: Keysight Technologies, Inc., Santa Rosa, CA (US)

(72) Inventor: Gerald Raymond Pepper, Newbury Park, CA (US)

(73) Assignee: KEYSIGHT TECHNOLOGIES, INC., Santa Rosa, CA (US)

( * ) Notice: Subject to any disclaimer, the term of this patent is extended or adjusted under 35 U.S.C. 154(b) by 0 days.

(21) Appl. No.: 16/453,941

(22) Filed: Jun. 26, 2019

(51) Int. Cl.
  *H04L 1/24* (2006.01)
  *H04L 1/20* (2006.01)
  *H04L 12/26* (2006.01)
  *H04L 1/00* (2006.01)

(52) U.S. Cl.
  CPC ............ *H04L 1/248* (2013.01); *H04L 1/0045* (2013.01); *H04L 1/0072* (2013.01); *H04L 1/203* (2013.01); *H04L 43/50* (2013.01)

(58) Field of Classification Search
  CPC ..... H04L 1/248; H04L 1/0054; H04L 1/0072; H04L 1/203; H04L 43/50
  USPC .......................................................... 375/224
  See application file for complete search history.

(56) References Cited

U.S. PATENT DOCUMENTS

| | | | |
|---|---|---|---|
| 5,710,781 A | 1/1998 | Zinser et al. | |
| 5,889,791 A | 3/1999 | Yang | |
| 5,896,403 A | 4/1999 | Nagasaki et al. | |
| 6,320,852 B1 | 11/2001 | Obuchi et al. | |
| 6,684,351 B1 | 1/2004 | Bendak et al. | |
| 8,838,722 B2 | 9/2014 | Ridges et al. | |
| 10,236,907 B2 | 3/2019 | Szczepanek et al. | |
| 10,567,123 B2 | 2/2020 | Pepper | |
| 2003/0106014 A1 | 6/2003 | Dohmen et al. | |
| 2006/0245505 A1 | 11/2006 | Limberg | |
| 2006/0246836 A1* | 11/2006 | Simon .................... | H04L 27/02 455/3.01 |
| 2008/0065942 A1 | 3/2008 | Pleasant | |
| 2018/0123613 A1* | 5/2018 | Szczepanek ........ | H03M 13/015 |
| 2019/0268110 A1 | 8/2019 | Pepper | |
| 2019/0303033 A1* | 10/2019 | Noguera Serra ..... | G06F 3/0683 |
| 2020/0076720 A1* | 3/2020 | Riani .................... | H04L 1/0057 |

FOREIGN PATENT DOCUMENTS

EP  1 204 240 A2  5/2002

OTHER PUBLICATIONS

Non-Final Office Action for U.S. Appl. No. 15/905,097 (dated Jun. 28, 2019).

(Continued)

*Primary Examiner* — Ted M Wang

(57) ABSTRACT

According to one method for obtaining information from a hardened forward error correction (FEC) implementation, the method occurs at a test device implemented using at least one processor and at least one memory. The method includes copying data from a data stream that is to be processed by a hardened FEC engine; delaying the copied data while the hardened FEC engine generates corresponding error corrected output using the data; comparing the copied data and the corresponding error corrected output for differences; and generating FEC related metrics based on the comparison.

20 Claims, 3 Drawing Sheets

(56) References Cited

OTHER PUBLICATIONS

Notice of Allowance for U.S. Appl. No. 15/905,097, dated (Nov. 15, 2019).
Commonly-assigned, co-pending U.S. Appl. No. 15/905,097 for "Methods, Systems and Computer Readable Media for Evaluating Link or Component Quality Using Synthetic Forward Error Correction (FEC)," (Unpublished, filed Feb. 26, 2018).
Wikipedia, "Forward Error Correction," Wayback Machine, pp. 1-6 (Accessed Dec. 26, 2017).
Mustafa et al, "Performance Evaluation of Variant Error Correction Schemes in Terms of Extended Coding Rates & BER for OFDM Based Wireless Systems," International Journal of Wireless Communications and Mobile Computing, vol. 4, Issue 1, pp. 7-11 (Jan. 2016).
Farrugia et al., "A Statistical Bit Error Generator for Emulation of Complex Forward Error Correction Schemes," IEEE, pp. 1-6 (2007).
Commonly-assigned, co-pending U.S. Appl. No. 16/557,426 for "Methods, Systems, and Computer Readable Media for Generating Analog-Distorted Test Data," (Unpublished, filed Aug. 30, 2019).
"Anritsu Strengthens MP1900A BER Test Functions for More Efficient Verification of 400GbE Transceivers and DSP," Signal Integrity Journal, pp. 1-6 (Mar. 5, 2019).
"32 G/64 Gbaud Multi Channel PAM4 BERT," Anritsu envision: ensure, pp. 1-30 (Feb. 2019).
"Accelerating from 100GE to 400GE in the Data Center Advanced Modulation and Coding Challenges," Keysight Technologies, pp. 1-6 (Sep. 10, 2018).

\* cited by examiner

METHODS, SYSTEMS, AND COMPUTER READABLE MEDIA FOR TESTING OF HARDENED FORWARD ERROR CORRECTION (FEC) IMPLEMENTATIONS

TECHNICAL FIELD

The subject matter described herein relates to testing devices. More specifically, the subject matter relates to methods, systems, and computer readable media for obtaining information from hardened forward error correction (FEC) implementations.

BACKGROUND

Conventional test systems have issues when attempting to gather metrics from hardened forward error correction (FEC) implementations because hardened FEC implementations generally do not provide an application programming interface (API) or other mechanisms for obtaining performance metrics directly from the FEC implementations. For example, a hardened FEC implementation may include a FEC module that has been hardened by being implemented in hardware or firmware. Such modules perform FEC functions on data and do not provide reporting interfaces.

Accordingly, in light of these difficulties, a need exists for methods, systems, and computer readable media for obtaining information from hardened FEC implementations.

SUMMARY

Methods, systems, and computer readable media for obtaining information from hardened forward error correction (FEC) implementations are disclosed. According to one method for obtaining information from a hardened FEC implementation, the method occurs at a test device implemented using at least one processor and at least one memory. The method includes copying data from a data stream that is to be processed by a hardened FEC engine; delaying the copied data while the hardened FEC engine generates corresponding error corrected output using the data; comparing the copied data and the corresponding error corrected output for differences; and generating FEC related metrics based on the comparison.

A system for obtaining information from hardened FEC implementations includes a test device. The test device is implemented using at least one processor and at least one memory. The test device is configured for: copying data from a data stream that is to be processed by a hardened FEC engine; delaying the copied data while the hardened FEC engine generates corresponding error corrected output using the data; comparing the copied data and the corresponding error corrected output for differences; and generating FEC related metrics based on the comparison.

The subject matter described herein may be implemented in software in combination with hardware and/or firmware. For example, the subject matter described herein may be implemented in software executed by a processor. In one example implementation, the subject matter described herein may be implemented using a computer readable medium having stored thereon computer executable instructions that when executed by the processor of a computer control the computer to perform steps. Example computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including one or more processors and memory.

As used herein, each of the terms "function", "engine", and "module" refers to hardware, firmware, or software in combination with hardware and/or firmware for implementing features described herein.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for obtaining information from hardened forward error correction (FEC) implementations. When testing one or more network nodes, it may be desirable to determine how reliable a utilized link or connection is by determining how much, if any, data from the link or connection is corrected by a FEC implementation (e.g., a FEC engine or module). However, conventional test systems may be unable to gather metrics from hardened FEC implementations because hardened FEC implementations generally do not provide an application programming interface (API) or other mechanisms for obtaining performance metrics directly from the FEC implementations.

In accordance with some aspects of the subject matter described herein, techniques, methods, and systems for obtaining information from hardened FEC implementations are disclosed. For example, a test system may be configured to indirectly obtain and/or generate FEC related metrics in environments where a hardened FEC engine is implemented. In this example, the test system may generate a copy of a data stream (e.g., one or more data frames) before the data stream is processed by a hardened FEC engine. The copied data may be temporarily buffered to introduce a propagation delay. The duration of the buffering may be tuned to match the processing speed of the hardened FEC engine (e.g., the ingress-to-egress transit time for streams processed by the hardened FEC engine). The delayed copied data (e.g., a data frame) and corresponding output (e.g., an error corrected version of the data frame) from the hardened FEC engine are compared by a data comparator, where the data comparator and/or another entity (e.g., an analyzer) can log differences and/or generate various metrics, e.g., bit error rate, errors per chunk, errors per frame, errors per stream, errors per line, a distribution of errors metric, etc.

Reference will now be made in detail to example embodiments of the subject matter described herein, examples of which are illustrated in the accompanying drawings. Wherever possible, the same reference numbers will be used throughout the drawings to refer to the same or like parts.

Figure 1:
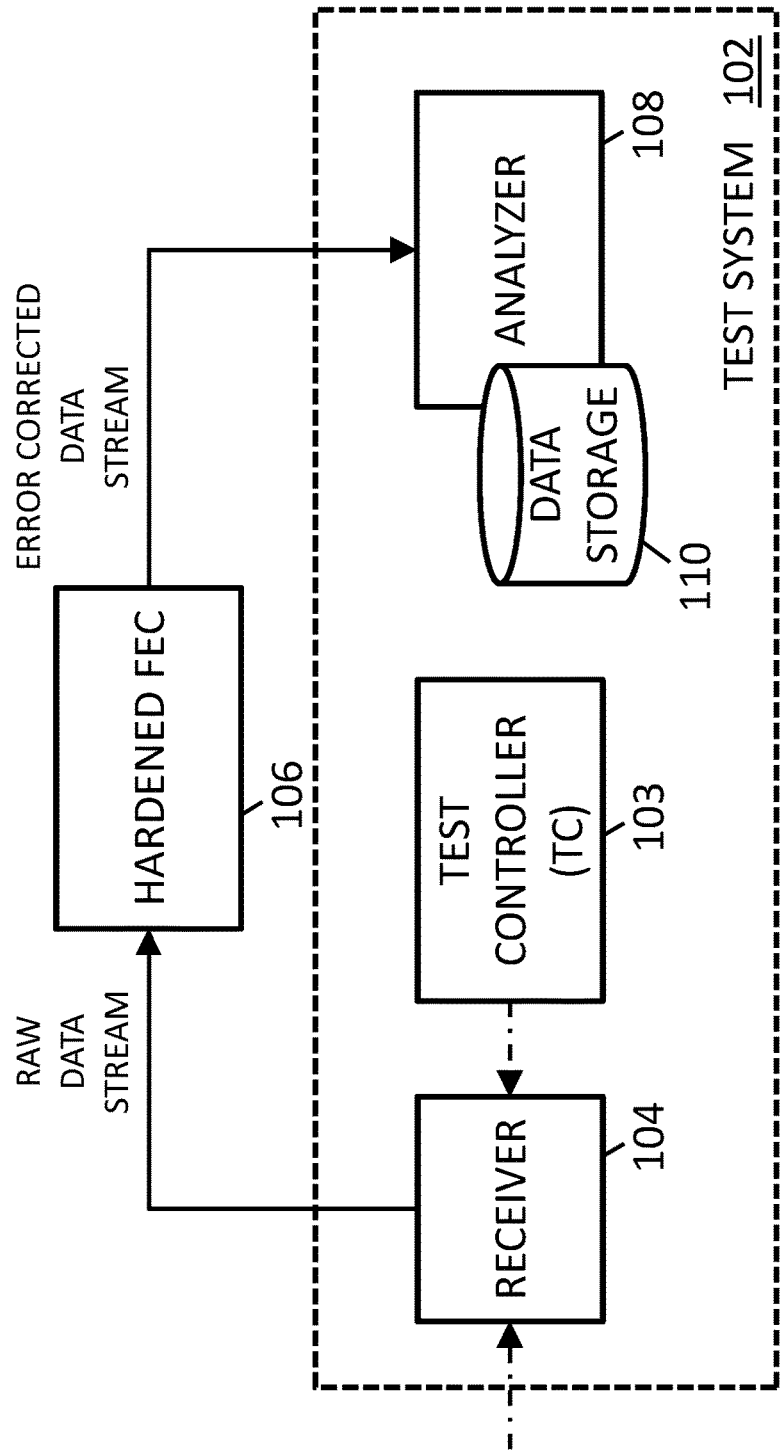
FIG. 1 is a diagram illustrating an example test environment for obtaining information from a hardened forward error correction (FEC) implementation.

FIG. 1 is a diagram illustrating an example test environment 100 for obtaining information from a hardened FEC implementation. Referring to FIG. 1, test environment 100 may include test system 102 and hardened FEC 106. Test system 102 may represent any suitable entity or entities (e.g., one or more computing platforms, nodes, or devices) associated with testing one or more devices, systems, or links. For example, test system 102 may generate test traffic (e.g., data streams) that traverses one or more links, e.g., 400 Gigabit Ethernet (GE), 200 GE, 100 GE, under test, where the test traffic is then processed by hardened FEC 106. In this example, test system 102 may obtain information from hardened FEC 106 so as to determine various metrics to indicate the health of the links, e.g., the state or quality of the test data prior to FEC processing.

In some embodiments, test system 102 or related entity may be configured for obtaining or deriving information (e.g., statistics) from hardened FEC 106. For example, test system 102 may generate and send, via a plurality of 400 GE or 200 GE links, raw data streams to hardened FEC 106 for testing the health of those links. In this example, test system 102 may obtain information from hardened FEC 106 during the testing and may analyze one or more performance aspects associated with the links based on statistics determined using the obtained information from hardened FEC 106.

In some embodiments, test system 102 may include a stand-alone tool, a testing device, a test device or platform, or software executing on one or more processor(s). In some embodiments, test system 102 may be a single device or node or may be distributed across multiple devices or nodes. In some embodiments, test system 102 may include one or more modules for performing various test related functions. For example, test system 102 may include a receiver module for receiving from 100 GE links under test, where the receiver module sends the received data to hardened FEC 106 and an analyzer module for analyzing data from hardened FEC 106 to determine FEC related performance or related test results.

Test system 102 may include or interact with a test controller (TC) 103, a receiver 104, an analyzer 108, and a data storage 110. In some embodiments, test system 102 and/or related entities may include or provide a communications interface for communicating with a test operator. In such embodiments, the test operator may be any entity (e.g., an automated system or a device or system controlled or controllable by a human user) for selecting and/or configuring various aspects associated with obtaining, deriving, and/or generating FEC related metrics. For example, user interfaces (e.g., an API and a graphical user interface (GUI)) may be provided for inputting or modifying configuration information, such as tests to be performed, types of metrics or statistics to be generated, and/or other settings.

In some embodiments, one or more user interfaces at test system 102 may support automation, e.g., via a representation state transfer (REST) API, a command line, and/or a web-based GUI. For example, a test operator may use a web browser to interact with a web-based GUI at TC 103 or receiver 104 for programming or configuring one or more aspects for obtaining statistics or other information from hardened FEC 106.

TC 103 may be any suitable entity or entities (e.g., software executing on a processor, a field-programmable gateway array (FPGA), and/or an application-specific integrated circuit (ASIC), or a combination of software, an FPGA, and/or an ASIC) for performing one or more aspects associated with controlling, configuring, and/or initiating obtaining information from hardened FEC 106 or various aspects thereof. In some embodiments, TC 103 may be implemented using one or more processors and/or memory. For example, TC 103 may utilize one or more processors (e.g., executing software stored in memory) to generate one or more FEC related test data that is to processed by hardened FEC 106. In another example, TC 103 may also utilize one or more processors to initiate various tests and/or analyses involving input and/or output from hardened FEC 106. In this example, TC 103 may send instructions to various modules or entities in test system 102 for controlling (e.g., modify, pause, restart, or stop) a test session.

Receiver 104 may be any suitable entity or entities (e.g., software executing on a processor, an ASIC, an FPGA, or a combination of software, an ASIC, and/or an FPGA) for performing one or more aspects associated with receiving data from a link (e.g., 200 GE, 100 GE, 400 GE, etc.) or another source (e.g., TC 103). For example, receiver 104 may be configured for receiving data frames or data streams from a 200 GE link and for sending the data frames or data streams to hardened FEC 106, and/or other aspects associated with interacting with hardened FEC 106. In some embodiments, receiver 104 may be implemented using a computing platform (e.g., a computer or a mobile device) using one or more processors and/or memory. For example, receiver 104 may utilize one or more network interface cards (NICs) or other suitable hardware, firmware, and/or software for receiving or transmitting data via ports (e.g., physical or logical communication end points).

Hardened FEC 106 may be any suitable entity or entities (e.g., an IC, an FPGA, an ASIC, or software executing on at least one processor) for performing FEC or related actions. For example, hardened FEC 106 may perform actions and/or operations to correct bit errors in a data stream or related data frames by using a FEC algorithm (e.g., a Viterbi algorithm or a Bahl, Cocke, Jelinek, and Raviv (BCJR) algorithm) and redundant data (e.g., error correction code (ECC) data) included in the data stream. In some embodiments, hardened FEC 106 may fail to provide metrics or data about its processing to outside entities. For example, hardened FEC 106 may not provide an application programming interface (API), a data file, or other mechanisms for obtaining performance metrics directly from hardened FEC 106. In some embodiments, after processing data, hardened FEC 106 may store the processed data (e.g., error corrected data frames) in data storage 110 for analysis by analyzer 108. In some embodiments, hardened FEC 106 may direct the FEC output to analyzer 108 for analysis.

Analyzer 108 may be any suitable entity or entities (e.g., an IC or software executing on at least one processor) for analyzing FEC output and/or other related information. For example, analyzer 108 may perform actions and/or operations to detect differences between FEC output (e.g., error corrected data frames) and original data (e.g., pre-processed data frames). In some embodiments, since hardened FEC 106 may fail to provide metrics or data about its processing to outside entities, analyzer 108 may attempt to identify differences by identifying markers in the FEC output and the original data and then analyze the FEC output and the original data based on the identified markers.

In some embodiments, analyzer 108 may generate FEC related metrics based on analysis of FEC output and corresponding original data. Examples of FEC related metrics may include a bit error rate, errors per chunk, errors per frame, errors per stream, errors per line, a distribution of errors metric, etc.

In some embodiments, test system 102, analyzer 108, and/or another entity may provide FEC related results to a test operator or other entity for inspection or another purpose. For example, after obtaining information from hardened FEC 106 during testing of a plurality of 400 GE links, test system 102 may generate an interactive report for a related GUI. In this example, the interactive reports may use various GUI elements to allow a test operator to more closely inspect certain metrics, test details, or other data related to the health or performance of the tested links.

In some embodiments, TC 103, receiver 104, analyzer 108, and/or other entities in test system 102 may include functionality for accessing data storage 110 or other memory. Data storage 110 may be any suitable entity or entities (e.g., a storage device, memory, a non-transitory computer readable medium, or a storage system) for maintaining or storing information related to testing. For example, data storage 110 may store FEC processing times, test data (e.g., raw data for FEC processing), output data (e.g., error corrected data after FEC processing), test scheduling information, and FEC related metrics.

In some embodiments, data storage 110 may also contain information usable for generating statistics and/or metrics associated with one or more aspects of hardened FEC 106. For example, data storage 110 may contain metrics associated with one or more performance aspects of hardened FEC 106 during one or more test scenarios. In this example, data storage 110 may maintain a particular set of computed metrics for a first test session and may maintain another set of computed metrics for a second test session. In some embodiments, data storage 110 and/or memory may be located at test system 102, another node, or distributed across multiple platforms or devices.

It will be appreciated that FIG. 1 is for illustrative purposes and that various nodes, their locations, and/or their functions described above in relation to FIG. 1 may be changed, altered, added, or removed. For example, some nodes and/or functions may be combined into a single entity. Moreover, it will be appreciated that hardened FEC 106 may be part of test system 102. For example, hardened FEC 106 may be implemented in receiver 104 and test system 102 may obtain data from hardened FEC 106 as part of a self-diagnostic or related testing.

Figure 2:
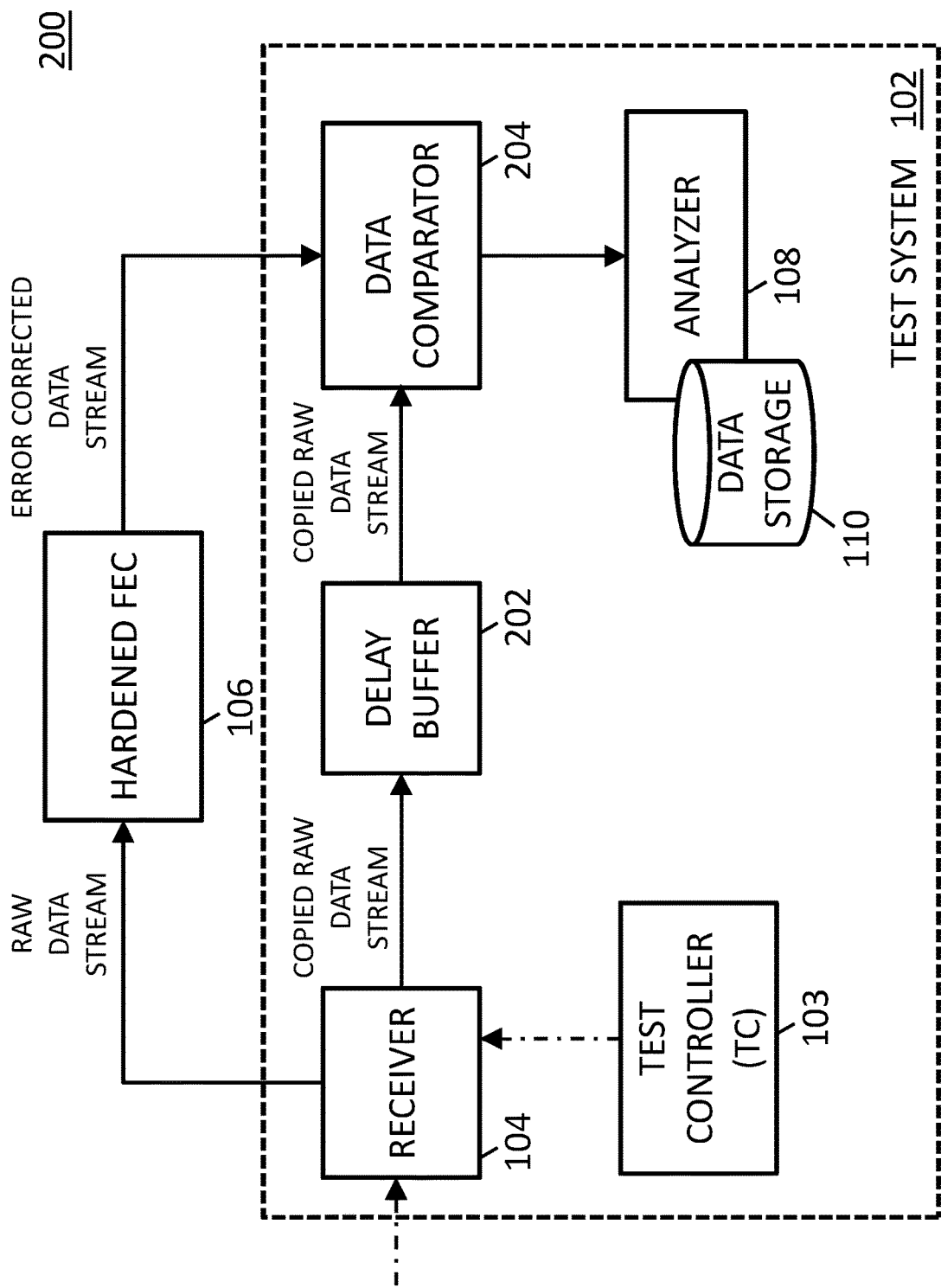
FIG. 2 is a diagram illustrating another example test environment for obtaining information from a hardened FEC implementation.

FIG. 2 is a diagram illustrating another example test environment 200 for obtaining information from a hardened FEC implementation. Referring to FIG. 2, test environment 200 may include test system 102 and hardened FEC 106. Test system 102 may represent any suitable entity or entities (e.g., one or more computing platforms, nodes, or devices) associated with testing one or more devices, systems, or links. For example, test system 102 may generate test traffic (e.g., data streams) that traverses one or more links, e.g., 400 Gigabit Ethernet (GE), 200 GE, 100 GE, under test, where the test traffic is then processed by hardened FEC 106. In this example, test system 102 may obtain or derive information from hardened FEC 106 so as to determine various metrics to indicate the health of the links, e.g., the state or quality of the test data prior to FEC processing.

In some embodiments, test system 102 may include components, modules, or entities with functionality similar to or the same as those entities described above with regard to FIG. 1. In some embodiments, test system 102 may include components, modules, or entities with additional and/or different functionality than those entities described above with regard to FIG. 1.

In some embodiments, test system 102 may include a stand-alone tool, a testing device, a test device or platform, or software executing on one or more processor(s). In some embodiments, test system 102 may be a single device or node or may be distributed across multiple devices or nodes. In some embodiments, test system 102 may include one or more modules for performing various test related functions. For example, test system 102 may include a receiver module for sending data to hardened FEC 106 and/or an analyzer module for analyzing data from hardened FEC 106 to determine FEC related statistics or other information.

Test system 102 may include or interact with data buffer 202 and data comparator 204 in addition to TC 103, receiver 104, analyzer 108, and data storage 110. In some embodiments, test system 102 and/or related entities may include or provide a communications interface for communicating with a test operator. In such embodiments, the test operator may be any entity (e.g., an automated system or a device or system controlled or controllable by a human user) for selecting and/or configuring various aspects associated with testing one or more links and/or for generating FEC related metrics. For example, user interfaces (e.g., an API and a GUI) may be provided for inputting or modifying configuration information, such as tests to be performed, types of metrics or statistics to be generated, and/or other settings.

In some embodiments, one or more user interfaces at test system 102 may support automation, e.g., via a REST API, a command line, and/or a web-based GUI. For example, a test operator may use a web browser to interact with a web-based GUI at TC 103 or receiver 104 for programming or configuring one or more aspects for testing links or systems and/or for interacting with hardened FEC 106.

TC 103 may be any suitable entity or entities (e.g., software executing on a processor, an FPGA, and/or an ASIC, or a combination of software, an FPGA, and/or an ASIC) for performing one or more aspects associated with controlling, configuring, and/or initiating testing of links and/or systems under test. TC 103 may also be configured for obtaining or deriving information (e.g., statistics) from hardened FEC 106 or for initiating obtaining or deriving information (e.g., statistics) from hardened FEC 106, e.g., via another entity.

In some embodiments, TC 103 may be implemented using one or more processors and/or memory. For example, TC 103 may utilize one or more processors (e.g., executing software stored in memory) to generate one or more FEC related test data that is to processed by hardened FEC 106. In another example, TC 103 may also utilize one or more processors to initiate various tests and/or analyses involving input and/or output from hardened FEC 106. In this example, TC 103 may send instructions to various modules or entities in test system 102 for controlling (e.g., modify, pause, restart, or stop) a test session.

Receiver 104 may be any suitable entity or entities (e.g., software executing on a processor, an ASIC, an FPGA, or a combination of software, an ASIC, and/or an FPGA) for performing one or more aspects associated with receiving and/or sending data. For example, receiver 104 may be configured for receiving data frames or data streams from a 400 GE link or port under test and for sending the data frames or data streams to hardened FEC 106, and/or other aspects.

In some embodiments, receiver 104 may be implemented using a computing platform or component(s) therein, e.g., one or more processors and/or memory. For example, receiver 104 may utilize one or more NICs or other suitable hardware, firmware, and/or software for receiving or transmitting data via ports (e.g., physical or logical communication end points).

In some embodiments, receiver 104 and/or a related tap (e.g., a network tap or monitoring/tap software) may copy data that is to be processed by hardened FEC 106 and may store or provide the copied data to data buffer 202 and/or data comparator 204. For example, receiver 104 and/or a related tap may copy data frames traversing a physical link, a virtual link, or bus/port that are destined for hardened FEC 106. In this example, receiver 104 and/or a related tap may store copied data (e.g., in data buffer 202) and/or may forward copied data to relevant entities (e.g., analyzer 108).

Data buffer 202 may be any suitable entity or entities (e.g., a storage device, memory, a non-transitory computer readable medium, or a storage system) for storing or buffering data. For example, data buffer 202 may include region of a physical memory storage used to temporarily store data while it is being moved from one process or entity to another process or entity.

In some embodiments, data buffer 202 may act as a delay buffer in that data buffer 202 stores data for a dynamic or static period of time. For example, a data frame or data chunk may be stored in data buffer 202 until hardened FEC 106 generates corresponding error corrected output or until the buffered data is needed by data comparator 204. In some embodiments, the length of time that data is stored in data buffer 202 may be based on the processing speed of hardened FEC 106. For example, a processing speed of hardened FEC 106 or related processing time may be based on predetermined specifications, e.g., published by the manufacturer of hardened FEC 106. In this example, data comparator 204 may be configured to retrieve or obtain data from data buffer 202 using an amount of time based on the predetermined specifications, such that data comparator 204 can compare the data from data buffer 202 and corresponding output from hardened FEC 106.

In some embodiments, a processing speed of hardened FEC 106 or related processing time may be determined by analyzing FEC processing during a test configuration phase. In this example, the test configuration phase may involve sending one or more special packets or frames to hardened FEC 106 and measuring the amount of time it takes hardened FEC 106 to generate output. In this example, data comparator 204 may be configured to retrieve or obtain data from data buffer 202 after that determined amount of time, such that data comparator 204 can compare the data from data buffer 202 and corresponding output from hardened FEC 106.

Hardened FEC 106 may be any suitable entity or entities (e.g., an IC, an FPGA, an ASIC, or software executing on at least one processor) for performing FEC or related actions. For example, hardened FEC 106 may perform actions and/or operations to correct bit errors in a data stream or related data frames by using a FEC algorithm (e.g., a Viterbi algorithm or a BCJR algorithm) and redundant data (e.g., error correction code (ECC) data) included in the data stream. In some embodiments, hardened FEC 106 may fail to provide metrics or data about its processing to outside entities. For example, hardened FEC 106 may not provide an application programming interface (API), a data file, or other mechanisms for obtaining performance metrics directly from hardened FEC 106. In some embodiments, after processing data, hardened FEC 106 may store the processed data (e.g., error corrected data frames) in data storage 110 for analysis by analyzer 108. In some embodiments, hardened FEC 106 may direct FEC output to analyzer 108 for analysis.

Data comparator 204 may be any suitable entity or entities (e.g., software executing on a processor, an ASIC, an FPGA, or a combination of software, an ASIC, and/or an FPGA) for performing one or more aspects associated with comparing data, e.g., data frames, packets, streams, etc. For example, data comparator 204 may be configured for receiving or obtaining data frames or data streams from hardened FEC 106 and for receiving or obtaining data frames or data streams from data buffer 202 and/or for comparing the two inputs. In some embodiments, data comparator 204 may be implemented using a computing platform (e.g., a computer or a mobile device) or component(s) therein, e.g., one or more processors and/or memory. For example, data comparator 204 may utilize an IC or other suitable hardware, firmware, and/or software for comparing symbols (e.g., bits or bytes) of two data streams.

In some embodiments, data comparator 204 may be configured to compare pre-processed or raw data frames (e.g., from data buffer 202) and corresponding error corrected data frames and may log or record the number of symbols within the frame that were corrected. In some embodiments, data comparator 204 may be configured to capture or obtain the data necessary to construct and display a histogram of per-frame symbol errors over time.

In some embodiments, data comparator 204 may be configured to record or log metadata for each corrected symbol, which may be used to determine the data lanes on which the symbol errors occurred. For example, a physical layer for a 400 Gigabit Ethernet connection may involve a number of aggregated data lanes. In this example, data comparator 204 may store metadata associated with corrected symbols of data associated with the 400 Gigabit Ethernet connection and may identify and a distribution of errors metric associated with the underlying data lanes in the 400 Gigabit Ethernet connection. Continuing with this example, such metrics may indicate whether certain data lanes in a physical or virtual connection are have more issues relative to other data lanes.

Analyzer 108 may be any suitable entity or entities (e.g., an IC or software executing on at least one processor) for analyzing results or output from data comparator 204 and/or other related information. For example, analyzer 108 may perform actions and/or operations using metadata and differences identified by data comparator 204. For example, analyzer 108 may generate FEC related metrics based on metadata and differences identified by data comparator 204. Examples of FEC related metrics may include a bit error rate, errors per chunk, errors per frame, errors per stream, errors per line, a distribution of errors metric, etc.

In some embodiments, test system 102, analyzer 108, and/or another entity may provide FEC related results to a test operator or other entity for inspection or other purpose. For example, after obtaining data from hardened FEC 106 while testing one or more 200 GE links, test system 102 may generate an interactive report for a related GUI. In this example, the interactive reports may use various GUI elements to allow a test operator to more closely inspect certain metrics, test details, or other data related to the health or performance of the tested links.

In some embodiments, TC 103, receiver 104, analyzer 108, and/or other entities in test system 102 may include functionality for accessing data storage 110 or other memory. Data storage 110 may be any suitable entity or entities (e.g., a storage device, memory, a non-transitory computer readable medium, or a storage system) for maintaining or storing information related to testing. For example, data storage 110 may store FEC processing times, test data (e.g., raw data for FEC processing), output data (e.g., error corrected data after FEC processing), test scheduling information, and FEC related metrics.

In some embodiments, data storage 110 may also contain information usable for generating statistics and/or metrics associated with one or more aspects of hardened FEC 106. For example, data storage 110 may contain metrics associated with one or more performance aspects of hardened FEC 106 during one or more test scenarios. In this example, data storage 110 may maintain a particular set of computed metrics for a first test session and may maintain another set of computed metrics for a second test session. In some embodiments, data storage 110 and/or memory may be located at test system 102, another node, or distributed across multiple platforms or devices.

It will be appreciated that FIG. 2 is for illustrative purposes and that various nodes, their locations, and/or their functions described above in relation to FIG. 2 may be changed, altered, added, or removed. For example, some nodes and/or functions may be combined into a single entity. Moreover, it will be appreciated that hardened FEC 106 may be part of test system 102. For example, hardened FEC 106 may be implemented in receiver 104 and test system 102 may obtain data from hardened FEC 106 as part of a self-diagnostic or related testing.

Figure 3:
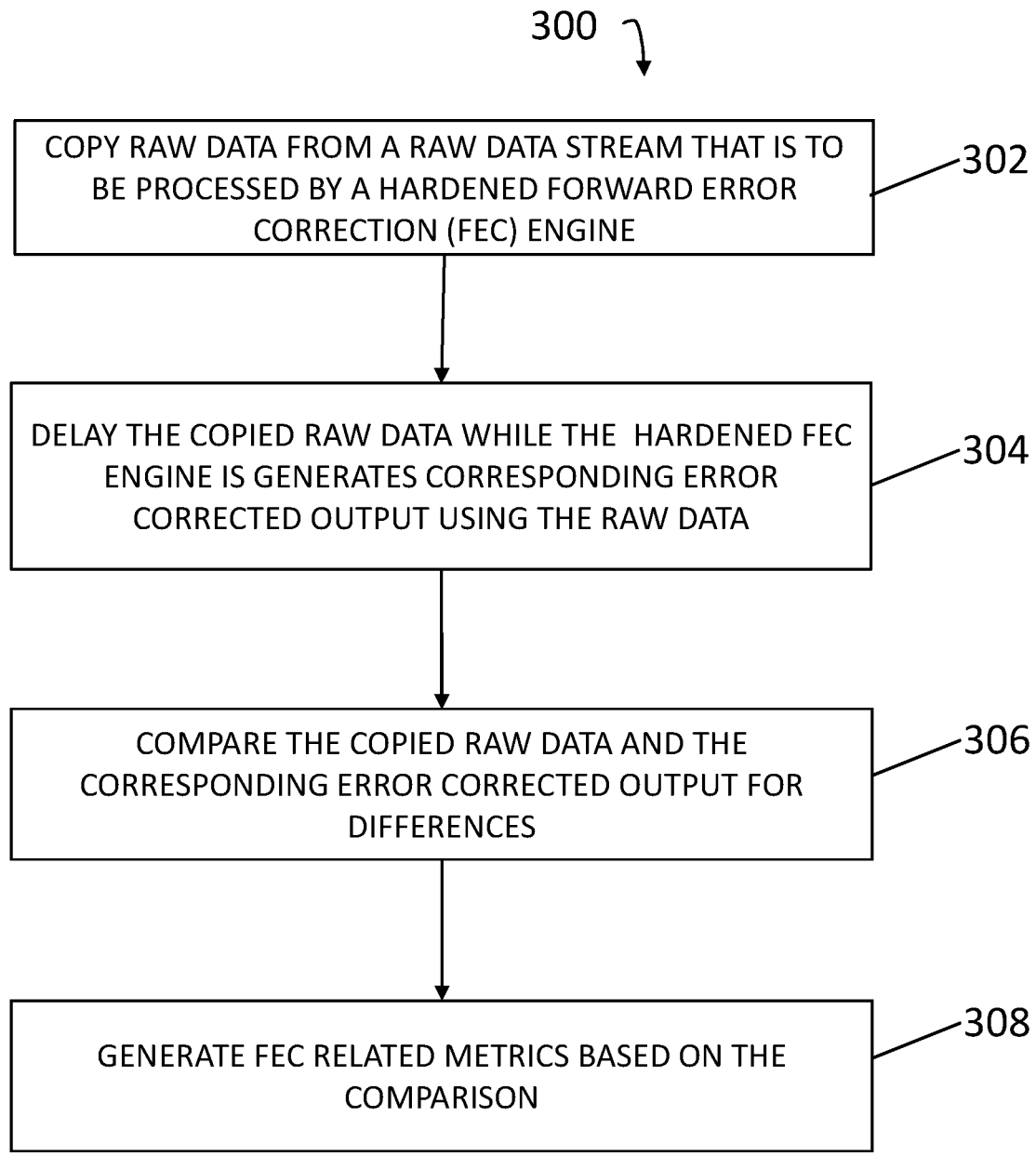
FIG. 3 is a diagram illustrating an example process for obtaining information from a hardened FEC implementation.

FIG. 3 is a diagram illustrating an example process 300 for obtaining information from a hardened FEC implementation. In some embodiments, example process 300, or portions thereof, may be performed by or at test system 102, a test device, receiver 104, data buffer 202, data comparator 204, analyzer 108, and/or another node or module.

In step 302, data (e.g., pre-FEC processed data) from a data stream (e.g., via a link or connection under test) that is to be processed by a hardened FEC engine may be copied. For example, test data (prior to FEC processing) may be sent via a 400 GE link to receiver 104 and receiver 104 may copy the test data prior to sending the test data to hardened FEC 106 for FEC processing.

In some embodiments, hardened FEC 106 may be a module implemented using at least one processor and/or part of a SoC or a network interface card (NIC). In some embodiments, a hardened FEC engine may include an FPGA, an ASIC, an integrated circuit (IC), or a system on a chip (SoC).

In some embodiments, copying data may be performed by a network tap or a data receiver. For example, receiver 104 may include a NIC or other entity for receiving data via a link or connection being tested and for transmitting the received data to hardened FEC 106. In this example, receiver 104 may include functionality for copying the data that is to be processed by hardened FEC 106 and providing the copied data to data buffer 202. In another example, a network tap or related device may be located between the path of receiver 104 and hardened FEC 106 and may be configured for copying data directed to hardened FEC 106 and providing the copied data to data buffer 202.

In step 304, the copied data may be delayed while the hardened FEC engine generates corresponding error corrected output using the data. For example, data buffer 202 may store copied data for a period of time such that corresponding output from hardened FEC 106 can be generated.

In some embodiments, delaying copied data may include storing the copied data in a data buffer for a period of time. In some embodiments, the period of time may be static or dynamic. In some embodiments, the period of time may be determined using a processing time of hardened FEC 106. For example, a processing time of hardened FEC 106 may be based on predetermined specifications, e.g., published by manufacturer. In another example, a processing time of hardened FEC 106 may be determined by analyzing FEC processing during a test configuration phase.

In step 306, the copied data and the corresponding error corrected output may be compared for differences. In some embodiments, comparing copied data and corresponding error corrected output for differences may be performed by a hardware-based data comparator or a software-based data comparator. For example, data comparator 204 may compare two data frames and identify symbols in the data frames that are different. In this example, data comparator 204 or analyzer 108 may generate metrics based on the data comparison.

In step 308, FEC related metrics may be generated based on the comparison. In some embodiments, FEC related metrics may include a bit error rate, errors per chunk, errors per frame, errors per stream, errors per line, or a distribution of errors metric.

It will be appreciated that example process 300 is for illustrative purposes and that different and/or additional actions may be used. It will also be appreciated that various actions described herein may occur in a different order or sequence.

It should be noted that test system 102 and/or functionality described herein may constitute a special purpose computing device. Further, test system 102 and/or functionality described herein can improve the technological field of testing networks and/or systems by providing mechanisms for obtaining statistics or other information from hardened FEC 106 and analyzing performance aspects of a system or one or more links under test using data from hardened FEC 106. For example, test system 102 may include data buffer 202, data comparator 204, and/or other entities for temporarily buffering copied data streams, so as to match the ingress-to-egress transit time for corresponding streams being processed by hardened FEC 106. In this example, a delayed copied data portion (e.g., a data frame) and corresponding output (e.g., an error corrected data frame) from hardened FEC 106 are compared by data comparator 204, where data comparator 204 and/or another entity (e.g., analyzer 108) can log differences and/or generate various metrics, e.g., bit error rate, errors per chunk, errors per frame, errors per stream, errors per line, a distribution of errors metric, etc. Continuing with this example, test system 102 may determine the health of one or more links under test based on the statistics based on the information from hardened FEC 106.

The subject matter described herein for obtaining information from hardened FEC implementations improves the functionality of test platforms and/or test tools by generating, deriving, and/or obtaining FEC related metrics from hardened FEC implementations, which can be useful in identifying problematic connections or links even when FEC implementations correct erroneous data from those connections or links. For example, a test device or system can copy data (e.g., a data frame before FEC processing) and then compare the copied data and corresponding FEC processed output (e.g., the data frame after error correction) for differences. It should also be noted that a computing platform that implements subject matter described herein may comprise a special purpose computing device (e.g., a test device) usable for testing and analyzing links or other systems and for using information from hardened FEC implementations to derive various statistics or FEC related metrics.

It will be understood that various details of the subject matter described herein may be changed without departing from the scope of the subject matter described herein. Further, while the subject matter described herein disclose some aspects within the context of network test systems, it will be appreciated that various aspects of the present subject matter described herein could be applied to any communication system that employs a hardened FEC, where FEC related metrics are desired. Furthermore, the foregoing description is for the purpose of illustration only, and not for the purpose of limitation, as the subject matter described herein is defined by the claims as set forth hereinafter.

What is claimed is:

1. A method for obtaining information from hardened forward error correction (FEC) implementations, the method comprising:
   at a test device implemented using at least one processor and at least one memory, wherein the test device includes a test controller for initiating testing of a hardened forward error correction (FEC) engine, wherein the testing includes:
      copying data from a data stream that is to be processed by the hardened FEC engine, wherein the copied data includes pre-FEC processed data containing errors;
      delaying the copied data while the hardened FEC engine generates corresponding error corrected output using the data;
      comparing the copied data and the corresponding error corrected output for differences; and
      generating FEC related metrics based on the comparison.

2. The method of claim 1 wherein delaying the copied data includes storing the copied data in a data buffer for a period of time.

3. The method of claim 2 wherein the period of time is static or dynamic.

4. The method of claim 2 wherein the period of time is determined using a processing time of the hardened FEC engine.

5. The method of claim 4 wherein the processing time of the hardened FEC engine is based on predetermined specifications or wherein the processing time of the hardened FEC engine is determined by analyzing FEC processing during a test configuration phase.

6. The method of claim 1 wherein comparing the copied data and the corresponding error corrected output for differences is performed by a hardware-based data comparator or a software-based data comparator.

7. The method of claim 1 wherein the FEC related metrics include a bit error rate, errors per chunk, errors per frame, errors per stream, errors per line, or a distribution of errors metric.

8. The method of claim 1 wherein copying the data is performed by a network tap or a data receiver.

9. The method of claim 1 wherein the hardened FEC engine includes a field-programmable gateway array (FPGA), an application-specific integrated circuit (ASIC), an integrated circuit (IC), or a system on a chip (SoC).

10. A system for obtaining information from a hardened forward error correction (FEC) implementation, the system comprising:
    at least one processor;
    at least one memory; and
    a test device implemented using the at least one processor and the at least one memory, wherein the test device includes a test controller for initiating testing of a hardened forward error correction (FEC) engine, wherein the test device is configured for performing the testing including:
       copying data from a data stream that is to be processed by a hardened FEC engine, wherein the copied data includes pre-FEC processed data containing errors;
       delaying the copied data while the hardened FEC engine generates corresponding error corrected output using the data;
       comparing the copied data and the corresponding error corrected output for differences; and
       generating FEC related metrics based on the comparison.

11. The system of claim 10 wherein the test device delays the copied data by storing the copied data in a data buffer for a period of time.

12. The system of claim 11 wherein the period of time is static or dynamic.

13. The system of claim 11 wherein the period of time is determined using a processing time of the hardened FEC engine.

14. The system of claim 13 wherein the processing time of the hardened FEC engine is based on predetermined specifications or wherein the processing time of the hardened FEC engine is determined by analyzing FEC processing during a test configuration phase.

15. The system of claim 10 wherein comparing the copied data and the corresponding error corrected output for differences is performed by a hardware-based data comparator or a software-based data comparator.

16. The system of claim 10 wherein the FEC related metrics include a bit error rate, errors per chunk, errors per frame, errors per stream, errors per line, or a distribution of errors metric.

17. The system of claim 10 wherein a network tap or a data receiver copies the data.

18. The system of claim 10 wherein the hardened FEC engine includes a field-programmable gateway array (FPGA), an application-specific integrated circuit (ASIC), an integrated circuit (IC), or a system on a chip (SoC).

19. A non-transitory computer readable medium comprising computer executable instructions embodied in the computer readable medium that when executed by at least one processor of a computer perform steps comprising:
    at a test device implemented using at least one processor and at least one memory, wherein the test device includes a test controller for initiating testing of a hardened forward error correction (FEC) engine, wherein the testing includes:
       copying data from a data stream that is to be processed by the hardened FEC engine, wherein the copied data includes pre-FEC processed data containing errors;
       delaying the copied data while the hardened FEC engine generates corresponding error corrected output using the data;
       comparing the copied data and the corresponding error corrected output for differences; and
       generating FEC related metrics based on the comparison.

20. The non-transitory computer readable medium of claim 19 wherein delaying the copied data includes storing the copied data in a data buffer for a period of time.

* * * * *